Figure 1:
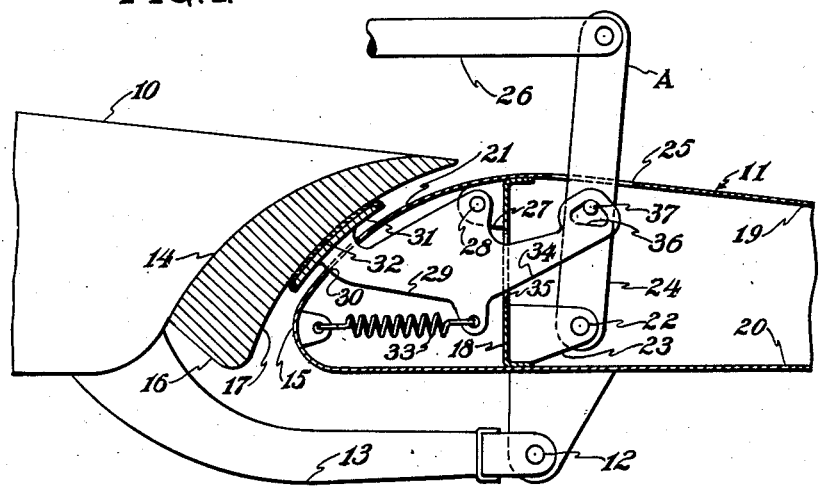

April 9, 1935.  F. R. WEYMOUTH  1,997,285
ANTIFLUTTER DEVICE
Filed May 17, 1933

INVENTOR.
FREDERICK R. WEYMOUTH
BY
ATTORNEYS.

UNITED STATES PATENT OFFICE 1,997,285

ANTIFLUTTER DEVICE

Frederick R. Weymouth, Buffalo, N. Y., assignor to Curtiss Aeroplane & Motor Company, Inc., a corporation of New York Application May 17, 1933, Serial No. 671,473

3 Claims. (Cl. 244—29)

This invention relates to aircraft, and particularly to means for overcoming uncontrolled flutter in the control surface thereof.

In the development of high speed aircraft, it has been noted that a phenomenon known as flutter sometimes occurs in the hinged control surfaces of such aircraft. This flutter appears to be an oscillation of the control surfaces induced by rapid air flow thereover, and may have extremely harmful effects, causing loss of control of the aircraft and possibly structural failure thereof. The exact causes of flutter have not been fully determined, but certain curative measures have been evolved which have a tendency to eliminate the phenomenon. This invention provides a positive acting mechanism operating in conjunction with the control members of an airfoil which has the effect of making the control of the airfoil irreversible. Briefly, the mechanism comprises a bearing shoe carried by the movable airfoil which is adapted to engage a coacting bearing block carried by the supporting structure. Means are provided for automatically allowing the shoe to engage the block when no control effort is placed upon the member controlling the airfoil. As soon as any control effort is placed upon the control member to move the airfoil, the shoe is disengaged from the block, permitting the airfoil to be freely movable. As soon as movement of the control member ceases, the bearing shoe immediately engages the bearing block, locking the airfoil against inadvertent movement from external forces and hence, completely eliminating flutter.

Objects of the invention, therefore, are to provide an irreversible control for the control airfoil of an aircraft; to provide mechanism in conjunction with the control airfoil to prevent inadvertent flutter or oscillation thereof due to external forces; to provide a shoe on a controllable airfoil adapted to engage with a block on the supporting structure; to provide mechanism for actuating said shoe to disengage the block upon manual control of the airfoil; to provide a shoe and block of such conformation that they may engage or disengage regardless of the angular position of the airfoil with respect to its supporting structure; to provide simple and effective anti-flutter mechanism for a control surface which will require a minimum of attention in service, and which may be easily produced.

Figure 2:
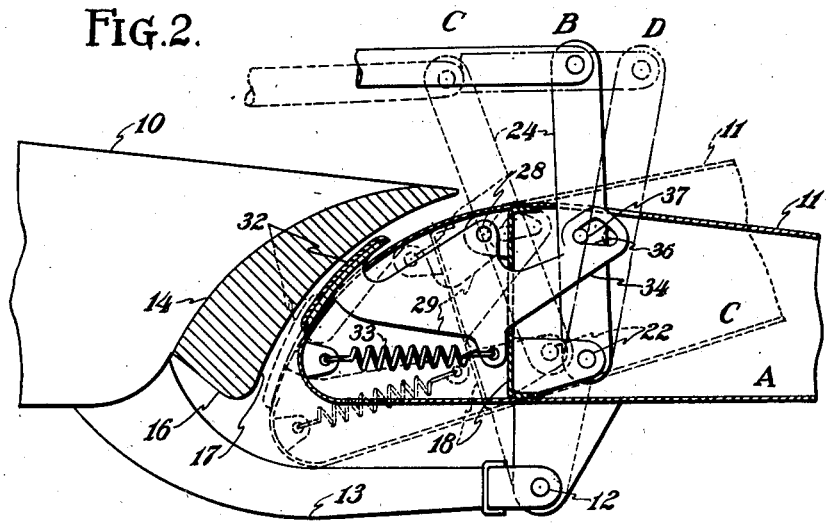

Further objects will become apparent by reading the annexed specification and claims and by a consideration of the drawing, in which similar numerals indicate similar parts, and in which:

Fig. 1 is a cross section through a portion of a wing and a movable airfoil equipped with the invention and showing the antiflutter mechanism in the position for locking the movable airfoil with respect to the wing; and Fig. 2 is a section similar to Fig. 1 showing the anti-flutter mechanism in different positions of adjustment.

The figures show my invention embodied in conjunction with a main wing 10 of an aircraft having an aileron 11 pivoted for movement with respect thereto as at 12. The pivot 12 is carried by an arm 13 extending downwardly and rearwardly from the wing 10. The trailing edge 14 of the wing 10 is spaced from the leading edge 15 of the aileron 11, in accordance with the currently accepted practice, in order that when the aileron is angled upwardly with respect to the wing 10, a portion of the air stream may pass between the trailing edge 14 and the leading edge 15 to provide for improved air flow over the rearward upper surface of the wing and aileron. In the space between the trailing edge 14 and the leading edge 15, a block 16 is attached to the wing 10, this block having a rearward arcuate surface 17 formed concentric with the aileron pivot 12. The aileron 11 comprises a beam 18 to which an upper covering 19 and a lower covering 20 are attached. These coverings 19 and 20 extend forwardly of the beam 18, and the upper covering 19 is formed with a portion 21 curved complementary to the curved surface 17 of the block 16.

A pivot 22, carried by a bracket 23 extending rearwardly from the lower portion of the beam 18, carries a control arm or lever 24, which extends upwardly through an opening 25 formed in the covering 19, to receive at its upper end a pivoted control rod 26. This control rod 26 may be connected to a suitable stick mechanism within the control compartment of the aircraft by any of the well known conventional means. Extending forwardly from the upper portion of the beam 18 is a bracket 27, having a pivot 28, on which a member 29 is carried for oscillation. A portion of the member 29 extends through an opening 30 in the curved forward covering 21 of the aileron, and carries a shoe 31 having a friction facing 32 which is adapted to engage, in certain positions of adjustment of the member 29, against the surface 17 of the block 16. The member 29 is constantly resiliently urged toward the position for engagement of the friction facing 32 with the block 16, by means of a spring 33 between said member and the leading edge of the aileron 11.

The member 29 has a rearward extension 34 passing through an opening 35 in the beam 18, this extension having formed at its rearward end a substantially triangular opening 36. A pin 37, carried by the arm 24, is adapted to engage within said triangular opening 36. The arrangement of the pin 37 in the opening 36 is such that the control arm, when in the position A of Fig. 1, carries the pin 37 toward the upper apex of the opening 36, which will allow the friction facing 32 to engage the block 16, thus holding the aileron 11 from oscillation with respect to the wing 10. When the control arm 24 is moved to the position B in Fig. 2, the pin 37 moves forwardly within the opening 36, causing the member 29 to be tilted in a counter-clockwise position about the pivot 28, thus disengaging the friction facing 32 from the block 16. Further forward movement of the control arm 24 moves the aileron 11 as a whole to a position C. When movement of the control 24 ceases, the pin 37 rides to the upper apex of the opening 36, permitting the spring 33 to force the friction facing 32 into engagement with the block 16, whereupon the aileron is locked in the new angular relationship with respect to the wing 10. Either rearward or forward movement of the control arm 24 from this new position will permit the aileron to be moved either up or down. As soon as the control arm 24 reaches a point of rest, the friction facing 32 engages the block 16 to lock the aileron 11 against flutter. The position D of the control arm 24 would occur when the control arm 24 is moved rearwardly from the position A to initiate lowering, or clockwise turning, of the aileron 11 about its pivot 12. It will be noted that the force for moving the aileron, as well as the force for unlocking the friction facing 32 from the block 16, is transmitted through the pin 37, through the member 29, and to the pivot 28 which is fixed to the aileron structure. By virtue of the conformation of the triangular opening 36 in the member 29, a small amount of lost motion or play is permitted in the control arm 24 before said control arm actually moves the aileron.

It will be readily appreciated that the mechanism above described may be applied with equal facility to other control surfaces than ailerons. For instance, the rudder and elevator controls may be similarly provided with the locking mechanism, the block 16 in such event being carried by the vertical fin or the horizontal stabilizer, respectively, or by the fuselage structure of the aircraft. I aim in the appended claims to cover such modifications in the use of the mechanism.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An irreversible control airfoil operating mechanism including a support and an airfoil hinged thereto, a block carried by and movable both with and with respect to said airfoil and organized to at times engage a portion of said support for holding said airfoil in fixed relation thereto, an operating lever pivoted to said airfoil and a connection between said lever and said shoe, said lever having a central position with respect to said airfoil wherein said shoe engages said support, and having positions on each side of said central position wherein said lever withdraws said shoe from engagement with said support.

2. In an irreversible control airfoil operating mechanism, a support to which said airfoil is pivoted for oscillation, a friction block carried by said support and having its surface concentric with said pivot, a shoe movably carried on said airfoil, resilient means normally urging said shoe into engagement with said block, a portion of said shoe having a cam thereon, an operating lever pivoted for slight oscillation with respect to said airfoil and having a member coacting with said cam, said lever member having a neutral position wherein said cam permits said shoe to engage with said block, and having offset positions on each side of said neutral position, wherein said lever member acts on said cam to disengage said shoe from said block.

3. In an irreversible control operating mechanism including a support and an airfoil hinged thereto, a member pivoted to said airfoil and having a shoe for frictionally engaging a portion of said support, said member having a substantially triangular opening therein, resilient means urging said shoe toward contact with said support, an operating lever pivoted to said airfoil, and a pin carried by said operating lever engaging within said triangular opening, said pin, when said lever is in its neutral position, taking a position adjacent an apex of said triangular opening to permit said shoe to contact said support, and said pin, when said lever is moved from its central position, contacting a side of said triangular opening to move said member and said shoe out of contact with said support, further movement of said lever serving to move said airfoil about its hinge.

FREDERICK R. WEYMOUTH.